Patented Aug. 25, 1931

1,820,606

UNITED STATES PATENT OFFICE

HENRY W. EASTERWOOD, OF NASHVILLE, TENNESSEE, ASSIGNOR TO VICTOR CHEMICAL WORKS, A CORPORATION OF ILLINOIS

PRODUCTION OF PHOSPHORUS IN VOLATILIZATION FURNACES

No Drawing.    Application filed March 23, 1929. Serial No. 349,519.

The present invention relates to the production of phosphorus and phosphorus compounds by volatilization processes wherein phosphorus minerals are charged together with suitable reducing materials into electrical or blast furnaces to effect reduction and volatilization of the phosphorus content of the mineral.

In the volatilization processes for producing phosphorus, including those wherein the phosphorus is oxidized to phosphorus pentoxide in or upon leaving the furnace, the stream of gas and vapor leaving the furnace carries with it, in addition to the phosphorus or vaporized phosphorus compound, fine particles of solid material separated from, or produced by reaction between, the constituents of the charge, particularly in the case of blast furnaces, where the combustion gases and residual nitrogen of the air used in the blast considerably augment the volume and velocity of the gas leaving the furnace. These fine particles are ordinarily designated as "fume", as distinguished from the heavier "dust" particles which are readily separated out, and may be removed from the gases from the volatilization furnace by means such as those commonly used in pig iron blast furnace practice for cleaning the gas, such as cyclone separators, dry filters and the like.

Such fume, as derived directly from reduction furnaces of the volatilization type, may contain from 5 to 35% $P_2O_5$ on proximate analysis. Thus typical fumes of this character shows on analysis 8.75% $P_2O_5$; 34.00% $P_2O_5$ and 18.25% $P_2O_5$. If the phosphorus content of the gases has been oxidized to $P_2O_5$, the fume is somewhat changed in composition, although of generally similar character.

It has hitherto been proposed, in such volatilization processes for the reduction of phosphorus minerals, such as phosphate rock, to grind the phosphorus mineral, the carbonaceous matter required for its reduction, and the silicious material required in the reduction reaction, (or only a part thereof, as described in the co-pending application of Easterwood and Weigel, Serial No. 348,115, filed March 18, 1929,) and to thoroughly mix these constituents and form them into coherent briquettes, which are charged into the volatilization furnace. In furnaces of the blast furnace type, additional coke or other carbonaceous material is likewise charged into the furnace to provide, by its combustion by air blast, the necessary heat for volatilizing the phosphorus and forming a molten slag from the constituents of the charge.

In accordance with the present invention, I incorporate into the briquettes thus utilized in the furnace from 1 to 5% of phosphorus volatilization furnace fume. It has been found that, when so incorporated, the fume not only supplies additional phosphorus-containing material for reduction in the operation, but also materially aids in sintering and binding together the briquettes and helping them to retain their form as the briquettes gradually pass into higher temperature zones in the furnace, thus materially improving the operation of the furnace.

Thus, in a typical operation conducted in a blast furnace, phosphate rock, such as run-of-mine Tennessee rock containing 22 to 27% of $P_2O_5$ is ground to a suitable size, say 20 to 40 mesh, and is briquetted with similarly ground coal sufficient in quantity to provide an excess over that necessary for reduction of the rock, such additional silicious material as is required in the reduction reaction and for the formation of a fusible slag, from 1 to 5% of fume and a suitable organic binder, such as sulfite liquor containing 50% of solids. Thus, briquettes suitable for the operation may be made up of 76 parts phosphate rock containing 24% $P_2O_5$ and 15 to 22% $SiO_2$, 15 parts coal containing 5 to 10% of ash, 7 parts silica, 2 parts of sulfite liquor and 1 to 3 parts of fume. Or, if desired, the additional silica may be in part or in whole omitted from the briquettes and added separately as pebble silica, as set forth in the Weigel and Easterwood application hereinbefore referred to. The blast furnace, which has previously been started in the manner customary in pig iron blast furnace practice, is charged with the briquettes, produced as hereinbefore described, and the necessary coke or other carbonaceous material to provide the necessary heat for reduction and volatilization of the phosphorus and for forming a readily fusible slag. The combustion of the coke or other carbonaceous material is effected by an air blast, preferably heated as in ordinary slag furnace practice, and the temperature of operation attained in the blast furnace is substantially the same as those prevailing in ordinary pig iron blast furnace practice, say from 1300 to 1600° C. The phosphorus-containing gas taken off from the furnace is cleaned of its fume content, which is again utilized in the manufacture of briquettes for the process, as hereinbefore described.

I claim:

1. Briquettes for use in the manufacture of phosphorus by the volatilization process, said briquettes comprising ground phosphorus mineral, carbonaceous material in proportion suitable for the reduction of the phosphorus mineral, and fume separated from gases driven off from a phosphorus volatilization process prior to alteration of the phosphorus content thereof.

2. Briquettes for use in the manufacture of phosphorus by the volatilization process, said briquettes comprising ground phosphorus mineral, carbonaceous material, silicious material for the production of a readily fusible slag in the furnace operation, and fume separated from gases derived from a phosphorus volatilization furnace prior to alteration of the phosphorus content thereof.

3. The method of operating a phosphorus volatilization furnace which comprises incorporating into compacted briquettes comminuted phosphorus mineral, carbonaceus material necessary for the reduction of its phosphorus content, and fume separated from gases from a phosphorus volatilization furnace prior to alteration of the phosphorus content thereof, and charging such briquettes into a volatilization furnace, to pass to the high temperature zone thereof.

4. The method of producing phosphorus in a volatilization furnace from phosphorus-containing mineral which comprises forming such material in comminuted form together with carbonaceous material necessary for the reduction of its phosphorus content into compacted briquettes, charging such briquettes into a volatilization furnace and causing them to pass into the high temperature zone therein whereby the phosphorus is reduced and a molten slag formed, discharging resulting vapors from said furnace, collecting the fume contained in said vapors before alteration in the phosphorus content thereof and incorporating the collected fume in briquettes to be charged to the furnace.

HENRY W. EASTERWOOD.